United States Patent [19]

Chervan et al.

[11] 4,443,540
[45] Apr. 17, 1984

[54] PROTEIN HYDROLYSIS

[75] Inventors: Munir Chervan; William D. Deeslie, both of Urbana, Ill.

[73] Assignee: University of Illinois Foundation, Urbana, Ill.

[21] Appl. No.: 420,196

[22] Filed: Sep. 20, 1982

Related U.S. Application Data

[63] Continuation of Ser. No. 154,388, May 9, 1980, abandoned.

[51] Int. Cl.³ .................. C12P 21/06; A23L 1/20; A23J 1/20; A23J 1/14
[52] U.S. Cl. .................... 435/69; 435/267; 435/272; 426/7; 426/46; 426/656; 426/657
[58] Field of Search ............ 435/68, 69, 267, 272; 426/7, 46, 656, 657

[56] References Cited

U.S. PATENT DOCUMENTS 4,293,571 10/1981 Olofsson et al. .................... 426/657

OTHER PUBLICATIONS

Zaborsky, "Immobilized Enzymes" CRC Press, 18901 Cranwood Parkway, Cleveland, OH 44128, pp. 110-114.

Primary Examiner—Thomas G. Wiseman
Assistant Examiner—J. E. Tarcza
Attorney, Agent, or Firm—Philip Hill

[57] ABSTRACT

The present invention prepares protein hydrolyzates by reacting selected protein material with at least one proteolytic enzyme and recovering the low molecular weight protein material by ultrafiltration while recycling the high molecular weight material and proteolytic enzyme for further hydrolysis. A series of ultrafilters of varying permeability may also be used.

25 Claims, 1 Drawing Figure

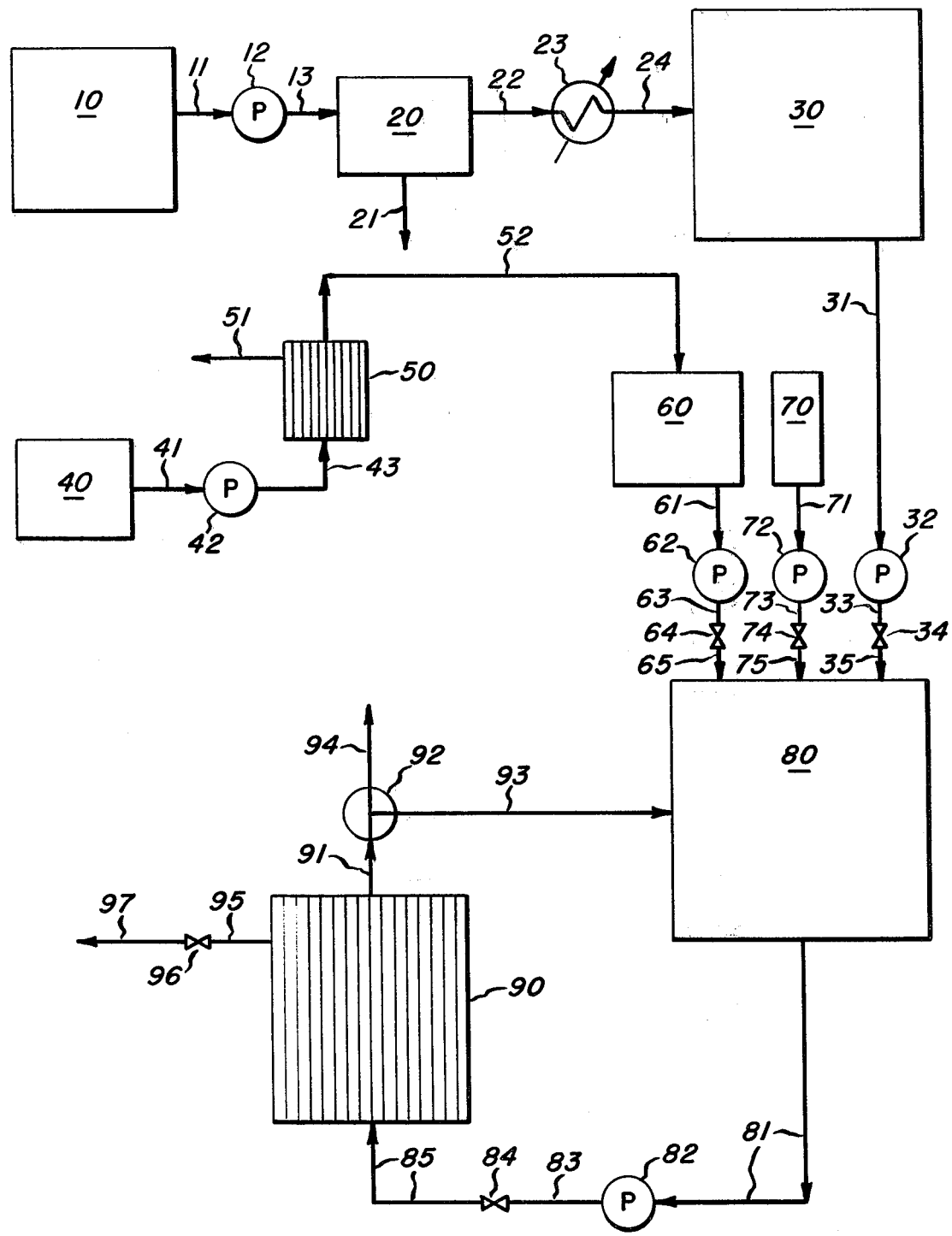

PROTEIN HYDROLYSIS

This application is a continuation of application Ser. No. 154,388, filed May 29, 1980, now abandoned.

BACKGROUND OF THE INVENTION

With increased emphasis in the food industry for modification of food ingredients to meet legal requirements and consumer demands, for purpose of reducing costs of new and existing products and for purpose of nutritional fortification of foods, new sources of functional proteins are emerging.

Functional properties of proteins which are of interest in foods include solubility, emulsification, foaming or whipping, water binding, fat binding, gelation, viscosity, thickening, adhesion, cohesion and flavor. Of utmost importance is the production of hydrolyzates with no off-flavors or bitterness.

During the past decade utilization of plant proteins, especially from soybeans, has increased tremendously, primarily for nutritional and economic reasons. In many cases, however, the texture or flavor needs to be altered for certain uses. Functionally modified proteins, collectively known as hydrolyzed proteins or hydrolyzates, have been introduced quite recently to meet this need.

The usual raw materials for manufacturing hydrolyzates are meat, fish, blood, dairy products, grains, alfalfa and other leaves, and oilseeds such as soybeans, peanuts, and cottonseed. Either chemical (acid or alkali) or enzymatic methods can be used to produce hydrolyzates. In acid hydrolysis, strong acids at high temperatures break the chemical bonds of the protein. Uncomplicated but relatively harsh, this treatment can result in some loss of essential amino acids and in undesirable side-reactions with non-protein components of the reaction mixture. Alkaline hydrolysis also requires fairly extreme conditions for producing the reaction. Consequently there is always the danger that lysinoalanine, a potentially toxic by-product, may form. In addition, the large amount of residual acid or alkali in the hydrolyzate limits its use in most food products.

Enzyme hydrolysis is an attractive alternative to chemical treatment because the process is mild. Moreover, the inherent specificity of various proteolytic enzymes should control the nature and extent of hydrolysis and thus the functional properties of the product.

Two major problems associated with this method have so far limited its general use. First, the cost of enzymes in conventional, batch-type hydrolytic systems can be prohibitive. The protein source and the enzyme are typically mixed in suspension at the optimum temperature and pH for a few hours. When the desired degree of hydrolysis is obtained, the enzyme is inactivated either by changing the pH, increasing the temperature, or both. Hence, the enzyme can be used only once. The heat treatment also adds to the cost of this method.

Second, the extent of the reaction must be carefully controlled. Studies to date indicate that if hydrolysis goes on too long, or is controlled, off-flavors or bitterness may develop.

The bitterness, which arises from the production of small peptides, seems to be especially pronounced if peptides with a low molecular weight are produced. However, this condition depends to some extent on the protein and on the specificity of the enzyme. Milk and soy proteins, in particular, often develop an intensely bitter flavor when hydrolyzed.

Many of the unwanted effects can be overcome by using enzyme immobilization or ultrafiltration, newer technologies that are developing rapidly. In the first of these, the enzyme is immobilized, either by chemical procedures or physical adsorption, when attached to a solid support such as silica, alumina, or iron oxide. The reaction mixture is then allowed to flow through a column containing the immobilized enzyme. The extent of hydrolysis is controlled essentially by the flow rate or length of time in the reactor. A major drawback is that immobilization causes a large drop in enzyme activity. The procedure is also fairly expensive.

Ultrafiltration employs membranes, which are essentially filters with very fine pores, that retain macromolecules but permit passage of small molecules.

Enzyme-membrane reactors have been demonstrated for hydrolysis of starch, and alfalfa, cottonseed, and fish proteins. In these studies, however, several problems were encountered, such as a rapid drop in reactor output from the accumulation of unhydrolyzed material on the membrane.

Earlier disclosures, as, for example, in U.S. Pat. Nos. 2,489,208; 3,713,843; and 3,830,942, have suggested that enzymatic proteolysis should be conducted at a pH comparable to the pH of end product use. Thus, for acidic products, such as low-acid beverages, where a highly soluble ingredient is needed, the hydrolysis should be performed at an acidic pH or at the iso-electric point of the protein. Problems arise, however, during neutralization of the acid hydrolyzates due to formation of salts, with accompanying salty taste and precipitation when added to acid beverages.

Large-scale production of soybean protein hydrolyzate has been conducted, employing a laminar flow, modular membrane of cellulose acetate for separation of reaction products. Hydrolysis was conducted under acidic conditions, at pH 3.7, and high temperature, 60° C. Hydrolysis under these conditions leads to reduction in nutritional quality of reaction products by destruction of labile amino acids such as tryptophane and methiomine.

One application of enzymatically hydrolyzed proteins is in "defined formula" diets, or "medical foods", for consumption by those unable to properly digest or absorb whole protein. In clinical cases of severe pancreatic enzyme insufficiency or malabsorption, it has been postulated that amino acids are better absorbed from hydrolyzed protein than from the intact protein. The primary source of such pre-digested protein today is casein, which has drawbacks such as poor palatability and high cost.

Considerable attention has also been directed towards producing an acid-soluble hydrolyzate for incorporation into acidic beverages for nutritional fortification. However, preparing a completely acid-soluble and clear protein requires excessive hydrolysis which is generally accompanied by formation of bitter flavor in the product.

There remains a need for significantly improved technology to provide effective and economic means for the production of such hydrolyzates in such a manner as to retain nutritional values while overcoming solubility and flavor problems associated with existing products.

SUMMARY OF THE INVENTION

This invention relates to a process, which may be operated in a continuous manner, for the preparation of protein hydrolyzate, comprising the steps of:

(a) hydrolyzing a selected protein material, dispersed in an aqueous medium, together with at least one proteolytic enzyme, at a controlled temperature and alkaline pH;

(b) separating the hydrolyzed protein material, by filtration employing a molecular weight-selective filter medium, into a lower molecular weight first protein filtrate fraction and a higher molecular weight second protein reject fraction;

(c) recycling at least a portion of the second protein fraction to the hydrolysis step; and (d) recovering low molecular weight protein hydrolyzate from the first protein fraction.

This invention additionally relates to the product, or product fractions, prepared by the process set forth above.

The process of this invention is broadly applicable to protein materials, and finds particular applicability to the production of protein hydrolyzates from oilseed protein isolates, as, for example, soybean protein isolate.

The products of this invention are characterized in having relatively narrow molecular weight distributions, complete water solubility, clarity, and the ability to provide flavor modification and water binding. Other properties, such as emulsification, foaming, or whipping, depending upon pre-selected molecular weight range, may be achieved. A selected fraction of the product of this invention is particularly effective in fortifying acidic beverages, such as orange juice, for nutritional purposes, where otherwise astringent, or acidic, flavor is masked.

DESCRIPTION OF THE DRAWING

FIG. 1 presents a schematic flow diagram illustrating, without limitation, an embodiment of the invention whereby low molecular weight protein hydrolysate is continuously produced.

With reference to the representation of FIG. 1, protein material may be isolated by any conventional procedure and slurried with water in vessel 10, with heating and stirring means not shown, and maintained at a temperature of from about 90° to about 100° C. After a suitable period of time, the slurry is passed through line 11, pump 12, and line 13 to filter zone 20. Residual solids are rejected through line 21. Soluble and dispersed protein material is passed through line 22, cooler 23, and line 24 to protein holding tank 30 where the aqueous protein material dispersion is maintained, with additional cooling as required, at a temperature within the range from about 25° to about 60° C.

Proteolytic enzyme material is introduced into vessel 40 as an aqueous dispersion and passed through line 41, pump 42, and line 43 into hollow-fiber membrane filtration zone 50. The fibers are pre-selected to permit molecular weight cut-off at a desired level, for example, 10,000 daltons. Lower molecular weight enzyme material is rejected through line 51 while enzyme material having a molecular weight greater than 10,000 daltons is transferred through line 52 to enzyme holding tank 60.

Protein material is fed, as required, through line 31, pump 32, line 33, control valve 34, and line 35 into protein hydrolysis reactor 80. Similarly, enzyme material is fed, as required, through line 61, pump 62, line 63, control valve 64, and line 65 to the hydrolysis reactor. The hydrolysis zone 80 is maintained at a temperature within the range from about 25° to about 60° C. Agitation is effected by stirring means, not shown. The pH of the aqueous hydrolysis system is maintained within the range from about 7.0 to about 9.0 by the addition of dilute aqueous alkali metal hydroxide, such as sodium hydroxide, as required, from vessel 70 through line 71, pump 72, line 73, control valve 74, and line 75.

Partially hydrolyzed protein material is continuously withdrawn from hydrolysis reactor 80 through line 81, pump 82, line 83, control valve 84 and line 85 and introduced into hollow-fiber membrane filtration zone 90, employing fibers pre-selected to effect molecular weight cut-off at the desired product level, for example, 10,000 daltons. Insufficiently hydrolyzed protein material is rejected by the membrane filter, passed through line 91 and three-way control valve 92, the latter being set for either recycle to reactor 80 through line 93 or passage to disposal through line 94. The desired hydrolyzate product, having a pre-selected molecular weight range, is passed through line 95, control valve 96, and line 97 to collection means, not shown.

DESCRIPTION OF THE INVENTION

Protein hydrolyzates are prepared by a process, in either batch or continuous manner, comprising the steps of:

(a) hydrolyzing a selected protein material, dispersed in an aqueous medium, together with at least one proteolytic enzyme, at a controlled temperature and alkaline pH;

(b) separating the hydrolyzed protein material, by filtration employing a molecular weight-selective filter medium, into a lower molecular weight first protein filtrate fraction and a higher molecular weight second protein reject fraction;

(c) recycling at least a portion of the second protein fraction to the hydrolysis step; and (d) recovering low molecular weight protein hydrolyzate from the first protein fraction.

The process may employ protein material from any of a great variety of sources, including meats, fish, dairy products, grains, leaf protein and oilseed protein, the latter from sources such as soybeans, peanuts, and cottonseeds. Protein material from oilseeds such as soybeans is particularly preferred for use in the process of this invention.

The process of this invention is particularly adapted to effecting protein hydrolysis in an alkaline medium of controlled pH to produce a product completely compatible with acidic food products. This process is further adapted to producing a series of protein hydrolyzate products, optimized for particular end uses by fractionation to yield a series of hydrolyzates, characterized by differing molecular weights and molecular weight distribution ranges.

Protein material is prepared for treatment by grinding, comminution, or other means to provide a suitably fine particle size for slurrying with water. In the instance of employing a soybean source material, the protein may be extracted and isolated by any of the well-known processes. It is preferred that the protein isolate so obtained be as pure as possible. The aqueous slurry is heated, with agitation, at a combination of temperature and time such that the initial reaction velocity of hydrolysis is maximized. For example, one such combination is 90°–100° C., maintained for 15 minutes to about 1 hour, preferably for about 30 minutes. If necessary, the heated slurry is then filtered or centrifuged to eliminate all solids having sufficiently large size that they may clog the inlet of the selected hollow fiber module. For example, if membranes supplied by Romicon Corporation, and designated as HF 15-45-XM50 Hollow Fiber membranes, are used, the particle size of the protein material in the isolate should be no greater than from about 80 to about 100 microns. The filtrate, comprising an aqueous dispersion, should contain from about 0.5 to about 4.5 wt. %, preferably about 1.0 wt. %, protein isolate. The protein isolate filtrate is then cooled and stored at a temperature within the range from about 25° to about 60° C., preferably from about 40° to about 50° C., for use in the hydrolytic process. In storage the pH of the aqueous dispersion may be adjusted to a value within the range from about 7.0 to about 9.0, preferably about 8.0.

A great variety of enzymes may be employed in the process of this invention provided that the enzyme be very proteolytic. Particularly suitable enzymes are the alkaline microbial proteases, trypsin, chymotrypsin, papain, or combination of these. A preferred enzyme for use in the alkaline hydrolysis of soybean protein material is a mixture of exo- and endo-peptidases, commercially available under the trademark Pronase B Grade from Calbiochem-Behring Corporation.

The selected enzyme is first dissolved or dispersed in water to provide a suitable concentration for use in the hydrolysis reactor, as, for example, about 1.0 wt. %, and, if required, subjected to filtration through an ultrafiltration membrane system to remove, as a filtrate, all enzyme material having a molecular weight less than a selected cut-off value, as, for example, about 10,000 daltons. The remaining enzyme solution, free of low molecular weight material, is then stored at a temperature within the range from about 25° to about 60° C., selected to minimize loss of activity, for subsequent use in the hydrolytic process. Alternatively, the enzyme solution may be employed directly in the hydrolytic process.

The hydrolysis step is conducted in a continuous stirred-tank reactor employing an enzyme to protein substrate weight ratio selected to obtain the desired level of conversion within a time period from about 10 to about 60 minutes, preferably about 30 minutes. For example, to achieve about 90% conversion, employing soy protein isolate as substrate and Pronase B Grade as the enzyme, the weight ratio of enzyme to protein should be within the range from about 1:10 to about 1:50, preferably from about 1:15 to about 1:20. Protein substrate material and enzyme are added to the hydrolysis reactor, as required, to maintain the selected weight ratio. Hydrolysis temperature is selected to fall within the range from about 25° to about 60° C., preferably from about 40° to about 50° C., and most preferably approximately 50° C. The alkalinity of the hydrolysis solution is maintained within the pH range from about 7.0 to about 9.0, preferably about 8.0, by the addition of an alkaline reagent as 1 N aqueous solution, as required, upon signal from an associated pH meter. Alkaline reagents include suitable alkali metal and alkaline earth hydroxides, preferably sodium or calcium hydroxide, with the choice dictated by the end use intended for the protein hydrolysate product. In the hydrolysis reactor, temperature is preferably controlled to about ±0.5° C. and pH is maintained within about ±0.1 unit.

Partially hydrolyzed aqueous protein material dispersion, from the steady-state conditions in the hydrolysis reactor, is continuously passed to a filtration zone, under pressure, comprising an ultrafiltration unit selected to have a large surface area-to-volume ratio and further selected to pass protein fractions having a molecular weight less than a selected cut-off value, as, for example, about 10,000 daltons. In general, membranes may be selected to have a molecular weight cut-off limits as great as about 50,000 or more daltons, provided the cut-off limit employed for the enzyme is equally great. Preferably, the molecular weight cut-off limit is less than about 10,000, and for particular end-use purposes, a value as low as from about 1,000 to about 5,000 may be suitably employed. In certain cases, where a suitably large enzyme is employed, it may be desirable to employ membranes having a molecular weight cut-off limit within the range from about 20,000 to about 40,000.

A preferred ultrafiltration unit is the hollow-fiber membrane, commercially available under the trademark Diaflo from the Amicon Corporation and under the trademark Romicon from the Romicon Corporation, having distinctive nominal cut-off molecular weight values. The hollow-fiber membranes are packed within a filter cartridge to permit flow therethrough, whereby suitably small molecules pass through the membrane, the hydrolyzate effluent rate being dependent upon the pressure drop across the membrane, and are taken in solution to a collecting zone, with the remainder of the solution, containing the higher molecular weight protein isolate or hydrolyzate passing directly along the fibrous tubes, for recycle to the hydrolysis reactor or to a separate collecting zone, as desired. The enzyme material, having a molecular weight higher than the selected membrane cut-off value, passes with the protein material rejected by the hollow-fiber membranes for recycle to the hydrolysis reactor.

The recovered selected protein hydrolyzate fraction may be concentrated, as by reverse osmosis or thermal evaporation and dried, as by freeze drying or spray drying, and sent to product storage for subsequent packaging and distribution.

If desired, the effective rate of filtration of protein hydrolyzate product may be increased by the use of two or more filter cartridges in parallel flow arrangement.

In a separate embodiment of this invention, the protein hydrolyzate product filtrate stream may be directed in series flow through two or more filter cartridges, having selected hollow-flow membrane elements of successively lower cut-off molecular weight values. In this manner a series of protein hydrolyzate fractions can be obtained, each having a distinctive molecular weight range. Each product stream may be dried as before for subsequent usage. Similarly, the protein reject fraction may be so treated to provide a series of fractions having successively higher molecular weight cut-off values.

In a further embodiment of this invention the protein hydrolysis may be conducted in a semi-continuous manner whereby the reaction is stopped at a selected stage and the enzyme deactivated, as by heating. The aqueous solution is then passed through a series of hollow-fiber membrane filter stages to segregate various molecular-weight fractions of the protein hydrolyzate.

In the process of this invention the enzyme material is maintained within the system and can be recycled a number of times, thus reducing the physical requirement and unit cost for enzymic reagents. The enzyme make-up rate is extremely low. Unlike the well-known batch processes, the continuous process described herein is more efficient in terms of productivity and presents no serious maintenance problems. For example, due to the activity of the enzyme and the composition in the hydrolysis reactor, there is no deposition of solids at the membrane surface, thus minimizing concentration polarization and fouling effects, and hence no need to back wash the membranes. Another advantage of the inventive process resides in employing a temperature level high enough to prevent microbial control while low enough to limit enzyme degradation. Hydrolysis and separation operations are conducted in different vessels which may each be designed to optimize its particular function.

The several protein hydrolyzate fractions, produced as variously described above, have been found to possess significantly distinctive properties. Solubility is the most important functional property of a protein or protein-derived material. Many commercial protein isolates are not particularly suitable for food product formulation, primarily because of their lack of solubility which appears to be necessary for protein to exert its other desirable properties. The extensively hydrolyzed products of this invention are completely dispersible over the entire pH range. These hydrolyzate fractions also exhibit a high degree of clarity over the entire pH range. Because of these desirable properties, these hydrolyzate fractions, particularly those having lower molecular weights, generally in the range from about 180 to about 2,400 daltons, have been found to be excellent fortifiers, particularly for acidic foods and beverages. Most surprisingly, these latter fractions do not possess the intensely bitter flavor commonly attributed to extensively hydrolyzed proteins, and, depending on the level of use, may mask the astringency, or sourness, of certain acidic beverages, such as orange, or grapefruit, juice.

Another important property exhibited by the protein hydrolyzate relates to its unusual ability to bind water. While unmodified protein may bind water, protein hydrolyzate is a more effective water binding agent. A major effect of this property is the impedance of spoilage by making water less available to bacteria. Accordingly, the hydrolyzates of this invention can be particularly effective for increasing nutrition and improving texture in various "intermediate moisture" foods, such as high energy food bars, moist packaged animal foods, space foods, and the like.

The protein hydrolyzates of this invention find particular value in formulating special diets to treat people who are allergic to proteins or who, because of pancreatic problems, are unable to digest and absorb protein from a normal diet. Sodium or salt levels in these hydrolzates can be maintained at a low level. Similarly, these hydrolysates can be eminently suitable for use in intravenous feeding, depending on the degree of hydrolysis realized.

It is commonly believed that functional properties are governed to a considerable degree by molecular size. The ultrafiltration system of this invention, employing membranes having a range of pore sizes, permits a unique continuous preparation of hydrolyzates having differing molecular sizes and accordingly unique combinations of functional properties.

When employing the process of this invention, as set forth in the drawing and under the preferred conditions as generally described above, employing a hollow-fiber membrane having a cut-off value of 10,000 daltons, soy isolate was hydrolyzed in the presence of Pronase to yield a product averaging 90 wt. % protein (N×6.25) and 8.5 wt. % ash, on a dry basis. The original isolate averaged 93 wt. % protein and 4.5 wt. % ash. These values are to be compared with typical ash contents of 16 wt. % found in commercially available enzyme-hydrolyzed protein prepared by a batch method, and 48–60 wt. % found in acid-hydrolyzed protein. Within 30 minutes to 60 minutes of startup, samples indicated a yield level of 90–92%. Steady conditions were maintained for over 40 hours. Longer run periods could be readily obtained by appropriate control of operational variables, such as enzyme concentration, substrate concentration, reaction volume and flow rate. A representative portion of the hydrolysate was analyzed by gel permeation chromatography, indicating the presence of three major fractions at respective molecular weights of 2400 (56%), 1400 (28%), and 300 (14%).

We claim:
1. A process for the hydrolysis of protein comprising the steps of:
   (a) hydrolyzing a selected protein material, dispersed in an aqueous medium together with at least one active proteolytic enzyme component, at a controlled temperature and alkaline pH;
   (b) separating the hydrolyzed protein material, by filtration employing a molecular weight-selective filter medium, into a lower molecular weight first protein filtrate fraction and a higher molecular weight second protein reject fraction, said second protein reject fraction including substantially all of the active proteolytic enzyme component;
   (c) recycling at least a portion of the second protein reject fraction to the hydrolysis step; and
   (d) recovering low molecular weight protein hydrolyzate from the first protein fraction.

2. The process of claim 1 wherein the selected protein material comprises a protein isolate derived from oil seeds.

3. The process of claim 2 wherein the selected protein material is a soybean isolate.

4. The process of claim 1 wherein the aqueous medium contains from about 0.5 to about 4.0 wt. % of selected protein material.

5. The process of claim 4 wherein the aqueous medium contains from about 1.0 to about 1.5 wt. % of selected protein material.

6. The process of claim 1 wherein the hydrolysis temperature is maintained within the range from about 25° to about 60° C.

7. The process of claim 1 wherein the alkaline pH of the hydrolysis medium is maintained within the range from about 7 to about 9.

8. The process of claim 7 wherein the alkaline pH of the hydrolysis medium is maintained by the controlled addition of a dilute aqueous solution of an alkali or alkaline earth metal hydroxide.

9. The process of claim 8 wherein the metal hydroxide is sodium hydroxide.

10. The process of claim 8 wherein the metal hydroxide is calcium hydroxide.

11. The process of claim 1 wherein the proteolytic enzyme comprises an alkaline protease.

12. The process of claim 1 wherein the filter medium comprises a hollow-fiber membrane.

13. The process of claim 12 wherein the hollow-fiber membrane is selected to permit passage into the filtrate of protein hydrolyzate having a molecular weight generally not greater than about 20,000.

14. The process of claim 13 wherein the hollow-fiber membrane is selected to permit passage into the filtrate of protein hydrolyzate having a molecular weight generally not greater than about 10,000.

15. The process of claim 1 wherein the first protein filtrate fraction is subjected to filtration successively through a series of selected hollow-fiber membranes to separate a plurality of protein hydrolyzate filtrate fractions characterized by successively lower average molecular weights.

16. The process of claim 15 wherein the first protein filtrate fraction is separated into a higher average molecular weight protein hydrolyzate fraction and a lower average molecular weight protein hydrolyzate fraction.

17. The process of claim 1 wherein the second protein reject fraction is subjected to filtration successively through a series of selected hollow-fiber membranes to separate a plurality of protein reject fractions characterized by successively higher average molecular weights.

18. The process of claim 1 wherein the protein material is first heated to about 100° C. for from about 10 to about 60 minutes and filtered to remove substantially all particles having a diameter greater than about 100 microns.

19. The process of claim 1 wherein the hydrolysis temperature is maintained within the range from about 25° to about 60° C. and the proteolytic enzyme comprises an alkaline protease.

20. The process of claim 1 wherein the respective steps are conducted in a continuous manner.

21. A continuous process for the enzymatic hydrolysis of protein material, comprising the steps of:
 (a) heating an aqueous slurry of protein material at a temperature within the range from about 90° to about 100° C.;
 (b) filtering the heated slurry through a filter medium selected to provide an aqueous protein material dispersion whose particles possess no dimension greater than about 100 microns;
 (c) cooling the filtered aqueous protein material dispersion to a temperature within the range from about 25° to about 60° C.;
 (d) providing an aqueous dispersion of a proteolytic enzyme material, pretreated by passage through a filter medium, comprising a first hollow-fiber membrane, to remove all components having a molecular weight less than the nominal molecular weight cut-off value of the hollow-fiber membrane;
 (e) introducing the aqueous protein material dispersion and pretreated proteolytic enzyme into an agitated hydrolysis zone, maintained at a temperature from about 25° to about 60° C., and at a pH from about 7.0 to about 9.0;
 (f) continuously transferring partially hydrolyzed protein material dispersion to a filtration zone, having a filter medium comprising a second hollow-fiber membrane selected to pass only protein hydrolyzate components having a molecular weight less than the nominal molecular weight cut-off value of the hollow-fiber membrane;
 (g) filtering the partially hydrolyzed protein material;
 (h) recovering a low molecular weight protein hydrolyzate f
 (i) recycling to the hydrolysis zone protein hydrolyzate material having a molecular weight greater than the nominal molecular weight cut-off value of the second hollow-fiber membrane together with the proteolytic enzyme material.

22. The process of claim 21 wherein the nominal molecular weight cut-off value of the first hollow-fiber membrane is about 10,000.

23. The process of claim 21 wherein the nominal molecular weight cut-off value of the second hollow-fiber membrane is about 10,000.

24. The process of claim 21 wherein the protein material is an oilseed protein and the aqueous slurry comprises ground, pressed oilseed.

25. The process of claim 24 wherein the oilseed protein is soybean protein.

* * * * *

UNITED STATES PATENT AND TRADEMARK OFFICE
CERTIFICATE OF CORRECTION

PATENT NO. : 4,443,540

DATED : April 17, 1984

INVENTOR(S) : Munir Cheryan et al.

It is certified that error appears in the above-identified patent and that said Letters Patent is hereby corrected as shown below:

On the title page, the name of the first inventor should read
-- Munir Cheryan --.

Signed and Sealed this

Eighteenth Day of November, 1986

Attest:

DONALD J. QUIGG

*Attesting Officer*      *Commissioner of Patents and Trademarks*